United States Patent Office 3,676,146
Patented July 11, 1972

3,676,146
CONTROLLING PREDETERMINED CHEMICAL REACTIONS IN PHOTOGRAPHIC IMAGE-WISE CONFIGURATION
Thomas F. Protzman, Worthington, Ohio, assignor to A. E. Staley Manufacturing Company, Decatur, Ill.
No Drawing. Filed Sept. 21, 1970, Ser. No. 74,121
Int. Cl. G03c 1/68, 5/00
U.S. Cl. 96—115
22 Claims

ABSTRACT OF THE DISCLOSURE

Process for carrying out a predetermined chemical reaction in image-wise configuration which comprises bringing into contact (1) a first layer comprising a composition capable of undergoing a predetermined chemical reaction with a second layer bearing a layer of powder particles in image-wise configuration, said powder particles comprising a component which, in minor proportion, exerts a major influence on the course of said predetermined chemical reaction and (2) carrying out said predetermined chemical reaction in a predetermined configuration conforming to the image-wise configuration of the powder particles of said second layer.

---

This invention relates to a process wherein (1) a first layer comprising a composition capable of undergoing a predetermined chemical reaction is brought into contact with a second layer bearing powder particles in image-wise configuration, said powder particles comprising a component which, in minor proportion, exerts a major influence on the course of said predetermined chemical reaction and (2) said predetermined chemical reaction is carried out in a predetermined configuration conforming to the image-wise configuration of the powder particles of said second layer.

There are numerous situations where it is desirable to apply a composition capable of undergoing a predetermined chemical reaction to an object or substrate, followed by carrying out said predetermined chemical reaction over predetermineod parts of the object or substrate to impart a decorative or functional surface to said object. For example, some predetermined chemical reactions are used to prepare printing plates, printed circuits, etc. In other cases, it may be desirable to apply a mat, grained, embossed, engraved or etched surface to an object. In general, the prior art processes, by their very nature, are generally limited to those where said predetermined chemical reaction is controlled directly by the composition's response to actinic radiation. In other words, the composition capable of undergoing said predetermined chemical reaction must be light-sensitive.

This superimposes various requirements on the composition capable of undergoing the predetermined chemical reaction which is not relatable to the functional or decorative effect desired. For example, photopolymerizable compositions must be compounded in a manner such that they are polymerizable only in the irradiated areas. Accordingly, the polymerizable composition must have some thermal stability (commonly below 85° C.) since most photopolymerizable reactions are mildly exothermic. Care must be taken in the selection of colorants, fillers or other additives in order to insure that these materials do not alter the rate of polymerization of the irradiated areas or affect the absorption or refraction of the actinic radiation. Whereas, one must consider carefully how each component (filler, colorant, polymerization catalyst, polymerization inhibitor, polymerizable material) used in the polymerizable composition will affect photopolymerization, the components used in the thermal polymerizable compositions are not as critical since the rate of polymerization can be adjusted by suitable choice of temperature and length of time at elevated temperature. Further, the prior art photopolymerization processes generally require special care or conditioning in order to avoid the inhibiting effect of oxygen on photopolymerization.

The prior art processes are also generally unsuitable for applying a reagent, having an insolubilizing effect, such as a tanning agent or crosslinker, or a solubilizing effect, such as an enzyme or dry etchant to a layer in a predetermined pattern.

The principal object of this invention is to provide a new method of imparting a predetermined decorative or functional pattern to an object or substrate. A more specific object of this invention is to provide a method of carrying out a predetermined chemical reaction on the surface of an object or substrate, where said predetermined chemical reaction is not necessarily controlled directly by actinic radiation. Other objects will appear hereinafter.

In the description that follows, the phrase "powder-receptive, solid, light-sensitive organic layer" is used to describe an organic layer which is capable of developing a predetermined contrast or reflection density ($R_d$) upon exposure to actinic light and embedment of black powder particles of a predetermined size in a single stratum at the surface of said organic layer. While explained in greater detail below, the $R_d$ of a light-ensitive layer is a photometric measurement of the difference in degree of blackness of undeveloped areas and black powder developed areas. The terms "physically embedded" or "physical force" are used to indicate that the powder particle is subject to an external force other than, or in addition to, either electrostatic force or gravitational force, resulting from dusting or sprinkling powder particles on a substrate. The terms 'mechanically embedded" or "mechanical force" are used to indicate that the powder particle is subjected to a manual or machine force, such as a lateral to-and-fro or circular rubbing or scrubbing action. The term "embedded" is used to indicate that the powder particle displaces at least a portion of the light-sensitive layer and is held in the depression so created, i.e. at least a portion of each particle is below the surface of the light-sensitive layer. The term "complementary reagent" refers to a material or component which, in minor proportion, exerts a major influence on the course of a predetermined chemical reaction.

The objects of this invention can be attained by bringing into contact (1) a first layer comprising a composition capable of undergoing a predetermined chemical reaction with a second layer bearing a monolayer of powder particles in image-wise configuration, said powder particles comprising a component which, in minor proportion, exerts a major influence on the course of said predetermined chemical reaction and (2) carrying out said predetermined chemical reaction in a predetermined configuration conforming to the image-wise configuration of the powder particles of said second layer. In effect, my invention takes advantage of the facts that (1) there are many materials which, although present in minor proportions, have a major effect on the course of a predetermined chemical reaction, (2) these materials can be deposited in powder form in image-wise configuration on a layer and (3) these materials, which are essentially catalytic, can be utilized to selectively control the predetermined chemical reaction in a predetermined configuration corresponding to the configuration of the powder particles.

Broadly speaking, the compositions capable of undergoing a predetermined chemical reaction of this invention can be divided into two types. One type contains all the chemicals necessary to carry out said predetermined chemical reaction while the other lacks one or more chemicals necessary to carry out said predetermined chemical reaction. With the first type, the powder particles of the second layer contain an inhibitor of the predetermined chemical reaction, while in the second case, the powder particles contain the complementary chemicals necessary for said predetermined chemical reaction. In general, the first type of predetermined chemical reaction results in the formation of an image or pattern on the first layer which is a negative of the predetermined image-wise configuration of the powder particles of the second layer. The second type of predetermined chemical reaction can lead to images, which are either positives or negatives of the predetermined image-wise configuration of the powder particles of the second layer. For example, negative images of the powder particles of the second layer are formed when the predetermined chemical reaction is a degradative reaction (undergraded areas remain where there are no powder particles) while positive images of the powder particles of the second layer are formed when the predetermined chemical reaction is a hardening reaction.

In a typical situation where the predetermined chemical reaction is an addition polymerization reaction, either a positive or negative of the powder particles of the second layer can be formed by use of powder particles comprising polymerization catalyst (or component thereof) or inhibitor. When the powder particles comprise a polymerization inhibitor, the polymerized areas corresponds to a negative of the image-wise configuration of the powder particles of the second layer. On the other hand, when the powder particles comprise a polymerization initiator, the polymerized areas correspond to a positive of the image-wise configuration of the powder particles of the second layer.

For example, where a predetermined chemical reaction of the first type is performed, a polymerizable composition comprising all of the components necessary to carry out said polymerization reaction are deposited in a first layer on the surface of the substrate to be imaged or decorated. The first layer is contacted with a second layer, containing powder particles in image-wise configuration comprising a polymerization inhibitor, and polymerized in a predetermined configuration corresponding to the inhibitor image. Polymerization occurs throughout and at the surface of the first layer in the areas where there is no polymerization inhibitor resulting in the formation of a polymeric pattern which is a negative of the image-wise configuration of powder inhibitor of the second layer. If desired, the polymerizable composition can be partially polymerized or gelled before being brought into contact with the inhibitor layer, be in an unpolymerized state and polymerized by the use of heat in the areas where there is no inhibitor or partially polymerized prior to being brought into contact with the polymerization inhibitor and post heated to complete the polymerization.

In the second type of situation, a polymerizable composition containing all of the ingredients necessary to carry out said predetermined chemical reaction, except the polymerization catalyst, or component thereof, are deposited on the surface of the substrate. This layer is then contacted with a second layer having powder particles in image-wise configuration comprising a suitable polymerization catalyst. In this case polymerization occurs only in the areas conforming to the image-wise configuration of the polymerization catalyst on the surface of the second layer and a positive pattern of the second layer is formed. By suitable choice of polymerization catalyst or inhibitor, it is possible to obtain various desirable structural patterns none of which are dependent on how the components of the polymerizable composition are affected by actinic radiation.

It is readily apparent that the processes of this invention can be advantageously employed to regulate and control numerous predetermined chemical reactions on the surface of an object or a substrate. Set forth below is a brief list of classes of compositions capable of undergoing a predetermined chemical reaction and complementary reagent for either controlling said predetermined chemical reaction or for completing the composition undergoing said predetermined chemical reaction, which can be employed in the process of this invention:

| Composition capable of undergoing predetermined chemical reaction | Complementary reagent |
| --- | --- |
| Polymerizable composition comprising a catalyst and polymerizable component or components. | Polymerization inhibitor. |
| Polymerizable composition comprising a polymerizable component or components lacking polymerization catalyst or component of the catalyst. | Polymerization catalyst or component of the catalyst. |
| Natural or synthetic polymeric material. | Cross-linker or tanning agent for said polymeric material. |
| Degradable film or foil. | Appropriate agent capable of degrading said film or foil. |
| Hydrophilic colloid and enzyme which is capable of degrading hydrophilic colloid, wherein the composition is at pH at which the enzyme is inactive. | Material capable of providing proper environment for activating said enzyme. |
| Two-component diazotype. | pH regulant to control coupling reaction. |

As indicated above, the process of this invention comprises (1) forming a layer bearing powder particles in image-wise configuration, said powder particles comprising a component, which, in minor proportion, exerts a major influence on the course of a predetermined chemical reaction, (2) bringing said layer bearing powder particles in image-wise configuration into contact with a first layer comprising a composition capable of undergoing said predetermined chemical reaction, and (3) carrying out the predetermined chemical reaction in a predetermined configuration conforming to the image-wise configuration of the powder particles.

PRODUCTION OF LAYER BEARING POWDER PARTICLES

The layer bearing powder particles is preferably produced by deformation imaging of the type described and claimed in copending, commonly assigned application Ser. No. 796,847, filed Feb. 5, 1969, now U.S. Pat. 3,637,385. In this process a light-sensitive organic layer capable of developing a $R_d$ of 0.2 to 2.2, preferably 0.4 to 2.0, is exposed to actinic radiation in image-receiving manner to establish a potential $R_d$ of 0.2 to 2.2; free flowing powder particles comprising said complementary component, which, in minor proportion, exerts a major influence on the course of said chemical reaction having a diameter, along at least one axis of at least about 0.3 micron but less than 25 times the thickness of said organic layer are applied to said layer of said organic material, while the layer of organic material is at a temperature below the melting point of the powder particles and of the organic layer; the powder particles are embedded as a monolayer in a stratum at the surface of said light-sensitive layer to yield an image having portions varying in density in proportion to the exposure of each portion; and non-embedded particles are removed from said organic layer, to develop a powder particle image comprising a component, which, in minor proportion, exerts a major influence on the course of said predetermined chemical reaction. This method of depositing complementary reagent is preferred since it provides a method of carefully controlling the amount of complementary reagent deposited in image-wise configuration. For example, the amount of complementary reagent can be carefully regulated by diluting the complementary reagent with a suitable inert material or carrier or by regulating the particle size of the developing powder. Further, unlike other powder development processes, which are incapable of regulating the number of parts developer deposited per unit area, the preferred method of this invention is susceptible of very careful control since only a monolayer of developing powder is deposited in the light-sensitive layer. Accordingly, the amount of complementary component delivered to the layer capable of undergoing said predetermined chemical reaction can be carefully regulated.

This method of depositing powder particles in image-wise configuration makes use of the phenomena that thin layers of many organic materials, some in substantially their naturally occurring or manufactured forms and others including additives to control their powder receptivity or sensitivity to actinic radiation, can have surface properties that can be varied within a critical range by exposure to actinic radiation between a particle-receptive condition and a particle-non-receptive condition. As explained below, the particle-receptivity and particle-non-receptivity of the solid thin layers are dependent on the size of the particles, the thickness of the solid thin layer and the development conditions, such as layer temperature.

Broadly speaking, the present method of forming powder images comprising a component which, in minor proportions, exerts a major influence on the course of said predetermined chemical reaction, differs from known methods of forming powder images in various subtle and unobvious ways. For example, the powder particles are not merely dusted on, but instead are applied against the surface of the light-sensitive organic layer under moderate physical force after exposing the light-sensitive layer to actinic radiation. The relatively soft or particle-receptive nature of the light-sensitive layer is such that substantially a monolayer of powder particles, or isolated small agglomerates of a predetermined size, are at least partially embedded at the surface of the light-sensitive layer by moderate physical force. The surface condition in the particle receptive area is at most only slightly soft but not fluid as in prior processes. The relatively hard or particle-non-receptive condition of the light-sensitive surface in the non-image areas is such that when powder particles of a predetermined size are applied under the same moderate physical force few, if any, are embedded sufficiently to resist removal by moderate dislodging action such as blowing air against the surface. Any particles remaining in the non-image areas are removed readily by rubbing a soft pad over the surface. In this way, the developed image and subsequently controlled predetermined chemical reactions are characterized by permitting or initiating the predetermined chemical reaction in proportion to the amount of actinic radiation applied to the light-sensitive organic layers.

For use in this invention, the solid, light-sensitive organic layer, which can be an organic material in its naturally occurring or manufactured form or a mixture of said organic material with plasticizers and/or photoactivators for adjusting the powder receptivity and sensitivity to actinic radiation, must be capable of developing a predetermined contrast or $R_d$ using a suitable black developing powder under the condition of development. The powder-receptive areas of the layer (unexposed areas of a positive-acting, light-sensitive material or the exposed areas of a negative-acting, light-sensitive material) must have a softness such that suitable particles can be embedded into a stratum at the surface of the light-sensitive layer by mild physical forces. However, the layer should be sufficiently hard that film transparencies can be pressed against the surface without the surfaces sticking together or being damaged even when heated slightly under high intensity light irradiation. The film should also have a degree of toughness so that it maintains its integrity during development. If the $R_d$ of the light-sensitive layer is below about 0.2, the light-sensitive layer is too hard to accept a suitable concentration of powder particles. On the other hand, if the $R_d$ is above about 2.2, the light-sensitive layer is so soft that it is difficult to maintain film integrity during physical development and the layer tends to adhere to transparencies precluding the use of vacuum frame or contact exposure equipment. Further, if the $R_d$ is above 2.2, the light-sensitive layer is so soft that more than one layer of powder particles may be deposited with attendant loss of image fidelity (and control of the predetermined chemical reaction) and the layer may be displaced by mechanical forces resulting in distortion or destruction of the image. Accordingly, for use in this invention the light-sensitive layer must be capable of developing a $R_d$ within the range of 0.2 to 2.2 or preferably 0.4 to 2.0, using a suitable black developing powder under the conditions of development.

The $R_d$ of a positive acting light-sensitive layer, which is called $R_{dp}$, is a photometric measurement of the reflection density of a black-powder developed light-sensitive layer after a positive-acting, light-sensitive layer has been exposed to sufficient actinic radiation to convert the exposed areas into a substantially powder-non-receptive state (clear the background). The $R_d$ of a negative-acting light-sensitive layer, which is called $R_{dn}$, is a photometric measurement of the reflection density of a black powder developed area, after a negative-acting, light-sensitive layer has been exposed to sufficient actinic radiation to convert the exposed area into a powder-receptive area.

In somewhat greater detail, the reflection density of a solid, positive-acting, light-sensitive layer ($R_{dp}$), is determined by coating the light-sensitive layer on a white substrate, exposing the light-sensitive layer to sufficient actinic radiation image-wise to clear the background of the solid positive-acting light-sensitive layer, applying a black powder (prepared from 77% Pliolite VTL and 23% Neo Spectra carbon black in the manner described below) to the exposed layer, physically embedding said black powder under the conditions of development as a monolayer in a stratum at the surface of said light-sensitive layer and removing the non-embedded particles from said light-sensitive layer. The developed organic layer containing black powder embedded image areas and substantially powder free non-image areas is placed in a standard photometer having a scale reading from 0 to 100% reflection of incident light or an equivalent density scale, such as on Model 500 A photometer of the Photovolt Corporation. The instrument is zeroed (0 density; 100% reflectance) on a powder free non-image area of the light-sensitive organic layer and an average $R_d$ reading is determined from the powder developed area. The reflection density is a measure of the degree of blackness of the developed surface which is relatable to the concentration of particles per unit area. The reflection density of a solid, negative-acting light-sensitive layer ($R_{dn}$) is determined in the same manner except that the negative-acting light-sensitive layer is exposed to sufficient actinic radiation to convert the exposed area into a powder receptive area. If the $R_d$ under the conditions of development is between 0.2 (63.1% reflectance) and 2.2 (0.63% reflectance), or preferably between 0.4 (39.8% reflectance) and 2.0 (1.0% reflectance), the solid, light-sensitive organic material deposited in a layer is suitable for use in this invention.

Although the $R_d$ of all light-sensitive layers is determined by using the aforesaid black developing powder and a white substrate, the $R_d$ is only a measure of the suitability of a light-sensitive layer for use in this invention.

Since the $R_d$ of any light-sensitive layer is dependent on numerous factors other than the chemical constitution of the light-sensitive layer, the light-sensitive layer is best defined in terms of its $R_d$ under the development conditions of intended use. The positive-acting, solid, light-sensitive organic layers useful in this invention must be powder receptive in the sense that the aforesaid black developing powder can be embedded as a monoparticle layer into a stratum at the surface of the unexposed layer to yield a $R_{dp}$ of 0.2 to 2.2 (0.4 to 2.0 preferably) under the predetermined conditions of development and light-sensitive in the sense that upon exposure to actinic radiation the most exposed areas can be converted into the non-particle receptive state (background cleared) under the predetermined conditions of development. In other words, the positive-acting, light-sensitive layer must contain a certain inherent powder receptivity and light-sensitivity. The positive-acting, light-sensitive layers are apparently converted into the powder-non-receptive state by a light-catalyzed hardening action, such as photopolymerization, photocrosslinking, photooxidation, etc. Some of these photohardening reactions are dependent on the presence of oxygen, such as the photooxidation of internally ethylenically unsaturated acids and esters while others are inhibited by the presence of oxygen, such as those based on the photopolymerization of vinylidene or polyvinylidene monomers alone or together with polymeric materials. The latter require special precautions, such as storage in oxygen-free atmosphere or oxygen-impermeable cover sheets. For this reason, it is preferable to use solid, positive-acting, film-forming, organic materials containing no terminal ethylenic unsaturation.

The negative-acting, solid, light-sensitive organic layers useful in this invention must be light-sensitive in the sense that, upon exposure to actinic radiation, the most exposed areas of the light-sensitive layer are converted from a non-powder-receptive state under the predetermined conditions of development to a powder-receptive state under the predetermined conditions of development. In other words, the negative-acting, light-sensitive layer must have a certain minimum light-sensitivity and potential powder receptivity. The negative-acting light-sensitive layers are apparently converted into the powder receptive state by a light-catalyzed softening action, such as photodepolymerization.

In general, the positive-acting, solid, light-sensitive layers useful in this invention comprise a film-forming organic material in its naturally occurring or manufactured form or a mixture of said organic material with plasticizers and/or photoactivators for adjusting powder receptivity and sensitivity to actinic radiation. Suitable positive-acting, film-forming organic materials, which are not inhibited by oxygen, include internally ethylenically unsaturated acids, such as abietic acid, rosin acids, partially hydrogenated rosin acids, such as those sold under the name Staybelite resin, wood rosin, etc., esters of internally ethylenically unsaturated acids, methylol amides of maleated oils such as described in U.S. Pat. 3,471,466 phosphatides of the class described in application Ser. No. 796,841, filed on Feb. 5, 1969, now U.S. Pat. 3,585,031 such as soybean lecithin, partially hydrogenated lecithin, dilinolenyl-alpha-lecithin, etc., partially hydrogenated rosin acid esters, such as those sold under the name Staybelite esters, rosin modified alkyds, etc.; polymers of ethylenically unsaturated monomers, such as vinyltoluene-alpha methyl styrene copolymers, polyvinyl cinnamate, polyethyl methacrylate, vinyl acetate-vinyl stearate copolymers, polyvinyl pyrrolidone, etc.; coal tar resins such as coumarone-indene resins, etc.; halogenated hydrocarbons, such as chlorinated waxes, chlorinated polyethylene, etc. Positive acting, light-sensitive materials, which are inhibited by oxygen include mixtures of polymers, such as polyethylene terephthalate/ sebacate, or cellulose acetate or acetate/butyrate, with polyunsaturated vinylidene monomers, such as ethylene glycol diacrylate or dimethacrylate, tetraethylene glycol diacrylate or dimethacrylate, etc.

Although numerous positive-acting, film-forming organic materials have the requisite light-sensitivity and powder receptivity at predetermined development temperatures, it is generally preferable to compound the film-forming organic material with photoactivator(s) and/or plasticizer(s) to impart optimum powder receptivity and light-sensitivity to the light-sensitive layer. In most cases, the light-sensitivity of an element can be increased many fold by incorporation of a suitable photoactivator capable of producing free-radicals, which catalyze the light-sensitive reaction and reduce the amount of photons necessary to yield the desired physical change.

Suitable photoactivators capable of producing free-radicals include benzil, benzoin, Michlers ketone, diacetyl, phenanthraquinone, p-dimethylaminobenzoin, 7,8-benzoflavone, trinitrofluorenone, desoxybenzoin, 2,3-pentanedione, dibenzylketone, nitroisatin, di(6-dimethylamino-3-pyridil)methane, metal naphtanates, N-methyl-N-phenylbenzylamine, pyridil, 5-7-dichloroisatin, azodiisobutyronitrile, trinitroanisole chlorophyl, isatin, bromoisatin, etc. These compounds can be used in a concentration of .001 to 2 times the weight of the film-forming organic material (.1%–200% the weight of film former). As in most catalytic systems, the best photoactivator and optimum concentration thereof is dependent upon the film-forming organic material. Some photoactivators respond better with one type of film former and may be useful over rather narrow concentration ranges whereas others are useful with substantially all film-formers in wide concentration ranges.

The acyloin and vicinal diketone photoactivators, particularly benzil and benzoin, are preferred. Benzoin and benzil are effective over wide concentration ranges with substantially all film-forming light-sensitive organic materials. Benzoin and benzil have the additional advantage that they have a plasticizing or softening effect on film-forming light-sensitive layers, thereby increasing the powder receptivity of the light-sensitive layers. When employed as a photoactivator, benzil should preferably comprise at least 1% by weight of the film-forming organic material (.01 times the film former weight).

Dyes, optical brighteners and light absorbers can be used alone or preferably in conjunction with the aforesaid free-radical producing photoactivators (primary photoactivators) to increase the light-sensitivity of the light-sensitive layers of this invention by converting light rays into light rays of longer lengths. For convenience, these secondary photoactivators (dyes, optical brighteners and light absorbers) are called "superphotoactivators." Suitable dyes, optical brighteners and light absorbers include 4-methyl-7-dimethylaminocoumarin, Calcofluor yellow HEB (preparation described in U.S. Pat. 2,415,373), Calcofluor white SB super 30080, Calcofluor, Uvitex W conc., Uvitex TXS conc., Uvitex RS (described in Textil-Rundschau 8 [1953], 339), Uvitex WGS conc., Uvitex K, Uvitex CF conc., Uvitex W (described in Textil-Rundschau B, [1953], 340), Aclarat 8678, Blancophor OS, Tenopol UNPL, MDAC S–8844, Uvinul 400, Thilflavin TGN conc., Aniline yellow-S (low conc.), Seto flavin T 5506–140, Auramine A, Calcozine yellow OX, Calcofluor RW, Calcofluor GAC, Acetosol yellow 2 RLS– PHF, Eosine bluish, Chinoline yellow-P conc. Ceniline yellow S (high conc.), Anthracene blue Violet fluorescence, Calcofluor white MR, Tenopol PCR, Uvitex GS, Acid-yellow-T-supra, Acetosol yellow 5 GLS, Calcocid OR. Y. Ex. conc., diphenyl brilliant flavin 7 GFF, Resoflorm fluorescent yellow 3 GPI, Eosin yellowish, Thiazole fluorescor G, Pyrazalone organe YB–3, and National FD&C yellow. Individual superphotoactivators may respond better with one type of light-sensitive organic film-former and photoactivator than with others. Further, some photoactivators function better with certain classes of brighteners, dyes and light absorbers. For the most part, the most advantageous combinations of these materials and proportions can be determined by simple experimentation.

As indicated above, plasticizers can be used to impart optimum powder receptivity to the light-sensitive layer. With the exception of lecithin, most of the film-forming light-sensitive organic materials useful in this invention are not powder-receptive at room temperature but are powder-receptive above room temperature. Accordingly, it is desirable to add sufficient plasticizer to impart room temperature (15 to 30° C.) or ambient temperature powder receptivity to the light-sensitive layers and/or broden the $R_{dp}$ range of the light-sensitive layers.

While various softening agents, such as dimethyl siloxanes, dimethyl phthalate, glycerol, vegetable oils, etc. can be used as plasticizers, benzil and benzoin are preferred since, as pointed out above, these materials have the additional advantage that they increase the light-sensitivity of the film forming organic materials. As plasticizer-photoactivators, benzoin and benzil are preferably used in a concentration of 1% to 80% by weight of the film-forming solid organic material.

The preferred positive-acting light-sensitive film formers containing no conjugated terminal ethylenic unsaturation include the esters and acids of internally ethylenically unsaturated acids, particularly the phosphatides, rosin acids, partially hydrogenated rosin acids and the partially hydrogenated rosin esters. These materials, when compounded with suitable photoactivators, preferably acylcins or vicinal diketones together with superphotoactivators, require less than 2 minutes exposure to clear the background of light-sensitive layers.

In general, the negative-acting light-sensitive layers useful in this invention comprise a film forming organic material in its naturally occurring or manufactured form, or a mixture of said organic material with plasticizers and/or photoactivators for adjusting powder receptivity and sensitivity to actinic radiation. Suitable negative acting film-forming organic materials include n-benzyl linoleamide, dilinoleyl-alpha-lecithin, castor wax (glycerol 12-hydroxy-stearate), ethylene glycol monohydroxy stearate, polyisobutylene, polyvinyl stearate, etc. Of these, castor wax and other hydrogenated ricinoleic acid esters (hydroxystearate) are preferred. These materials can be compounded with plasticizers and/or photoactivators in the same manner as the positive acting light-sensitive film-forming organic materials.

Some solid light-sensitive organic film formers can be used to prepare either positive or negative acting light-sensitive layers. For example, a poly(n-butyl methacrylate) layer containing 20 percent benzoin (20 parts by weight benzoin per 100 parts by weight polymer) yields good positive-acting images. Increasing the benzoin level to 100 percent converts the poly(n-butyl methacrylate) layer into a good negative-acting system.

The light-sensitive layers are formed by applying a thin layer of solid light-sensitive film-forming organic material having a potential $R_d$ of 0.2 to 2.2 (i.e. capable of developing a $R_{dp}$ or $R_{dn}$ of 0.2 to 2.2) to a suitable substrate (glass, metal, ceramic, paper, plastic, etc.) by any suitable means dictated by the nature of the material (hot-melt draw down, spray, roller coating or air knife, flow, dip or whirler coating from solvent solution, curtain coating, etc.) so as to produce a reasonably smooth homogeneous layer of from about 0.1 to 40 microns thick. The light-sensitive layer must be at least 0.1 micron thick and preferably at least 0.4 micron in order to hold suitable powders during development. If the light-sensitive layer is less than 0.1 micron, or the developing powder diameter is more than 25 times layer thickness, the light-sensitive layer does not hold powder with the tenacity necessary to form a permanent record. In general, as layer thickness increases, the light-sensitive layer is capable of holding larger particles. However, as the light-sensitive layer thickness increases, it becomes increasingly difficult to maintain film integrity during development. Accordingly, the light-sensitive layer must be from 0.1 to 40 microns, preferably from 0.4 to 10 microns, with 0.5 to 2.5 microns being best.

The preferred method of applying light-sensitive layers of predetermined thickness to a substrate comprises flow coating a solution in organic solvent vehicle (hydrocarbon, such as hexane, heptane, benzene, etc.; halogenated hydrocarbon, such as chloroform, carbon tetrachloride, 1,1,1-trichloroethane, trichloroethylene, etc.; alcohols, such as ethanol, methanol, propanol, etc.; ketones, such as acetone, methyl ethyl ketone, etc.) of the light-sensitive organic film former alone or together with dissolved or suspended photoactivators and/or plasticizers onto a substrate. The hydrocarbon and halohydrocarbons, which are excellent solvents for the preferred positive-acting, light-sensitive film formers containing no terminal conjugated ethylenic unsaturation, are the preferred vehicles because of their high volatility and low cost. Typically, solutions prepared with these vehicles can be applied to a substrate and air dried to a continuous clear film in less than one minute. In general, the halohydrocarbons have the advantages that they are non-flammable and can be used without danger of flash fires. However, many of these, such as chloroform and carbon tetrachloride, must be handled with care due to the toxicity of their vapors. Of all these solvents, 1,1,1-trichloroethane is preferred since it has low toxicity, is non-flammable, low cost and has high volatility. In general, the thickness of the light-sensitive layer can be varied as a function of the concentration of the solids dissolved in the solvent vehicle.

The substrates for the light-sensitive elements should be smooth and uniform in order to facilitate obtaining a smooth coating. The supports can be opaque or transparent. Suitable substrates include metals such as steel and aluminum plates, sheets and foils, glass, paper, cellulose butyrate, etc., polyethylene terephthalate, nylon, polystyrene, polyethylene, corona discharge treated polyethylene or polypropylene, Tedlar PVF (polyvinyl fluoride), polyvinyl alcohol, amylose, etc. In general, it is preferable to apply a subbing layer to paper substrates to slow down the penetration of organic solvent solutions and, other things being equal, facilitates the formation of thicker light-sensitive layers. If desired, the supports or bases can be subbed with various hydrophobic polymers, such as cellulose acetate, cellulose propionate, cellulose butyrate, polyethylene terephthalate, polystyrene, polyethylene, polypropylene, polyvinyl fluoride, etc. or hydrophilic layers such as polyvinyl alcohol, hardened gelatin, amylose, polyacrylic acid, etc.

After the substrate is coated with a suitable solid, light-sensitive organic layer, a latent image is formed by exposing the element to actinic radiation in image-receiving manner for a time sufficient to provide a potential $R_d$ of 0.2 to 2.2 (clear the background of the positive-acting, light-sensitive layers or establish a potential $R_{dn}$ of 0.2 to 2.2 with negative-acting, light-sensitive layers). The light-sensitive elements can be exposed to actinic light through a photographic positive or negative, which may be line, half-tone or continuous tone, etc.

As indicated, the latent images are preferably produced from positive-acting, light-sensitive layers by exposing the element in image-receiving manner for a time sufficient to clear the background, i.e. render the exposed areas non-powder receptive. As explained below the amount of actinic radiation necessary to clear the background varies to some extent with developer powder size and development conditions. Due to these variations, it is often desirable to slightly overexpose line and half-tone images in order to assure complete clearing of the background. Slightly more care is necessary for producing continuous-tone powder images since overexposure tends to decrease the tonal range of the developed image. In general, overexposure is preferred with negative-acting, light-sensitive elements in order to provide maximum contrast.

After the light-sensitive element is exposed to actinic radiation for a time sufficient to clear the background of a positive-acting, light-sensitive layer or establish a potential $R_{dn}$ of 0.2 to 2.2, a suitable developing powder comprising a component which, in minor proportions, exerts a major influence on the course of said predetermined chemical reaction having a diameter or dimension along one axis of at least 0.3 micron is applied physically with a suitable force, preferably mechanically, to embed the powder in the light-sensitive layer. The developing powder can be virtually any shape, such as spherical, acicular, platelets, etc.

The developing powder comprising a component which, in minor proportion, exerts a major influence on the course of said predetermined chemical reaction can be applied in a substantially pure form, if a solid at development temperature, or on a suitable carrier. Carriers, such as resinous or polymeric materials, clays (bentonite), metallic oxides, etc., can be employed to regulate the concentration of the complementary reagent to be applied or, in the case of a liquid complementary reagent, permit the application of the liquid complementary reagent to the light-sensitive layer in powder form. The complementary reagent, if solid, can be ball-milled with carrier in order to coat the carrier with complementary reagent, or, if desired, blended above the melting point of fusible or resinous carriers, ground to a suitable size and classified. In general, a liquid complementary reagent can be absorbed on the surface of a suitable solid carrier or encapsulated in suitable carrier. In some cases, it is advantageous to dissolve carrier and complementary reagent (solid or liquid) in a mutual solvent, dry and grind to suitable size. The developing pwoder can contain from about 0.1 to 100% by weight complementary reagent and correspondingly 99.9 to 0% by weight carrier.

The black developing powder for determining the $R_d$ of a light-sensitive layer is formed by heating about 77% Pliolite VTL (vinyltoluenebutadiene copolymer) and 23% Neo Spectra carbon black at a temperature above the melting point of the resinous carrier, blending on a rubber mill for fifteen minutes and then grinding in a Mikroatomizer. Commercially available powders such as Xerox 914 Toner give substantially similar results although tending towards slightly lower $R_d$ values.

As indicated above, a wide variety of chemicals can be employed as complementary reagents in the process of this invention. Suitable free-radical catalysts useful for controlling free-radical polymerization reactions include inorganic peroxides, organic peroxides and hydroperoxides. These include hydrogen peroxide, diisopropylbenzene hydroperoxide, cumene hydroperoxide, caproyl peroxide, methylethyl ketone peroxide, ammonium or potassium persulfates, etc. Other free-radical catalysts are also useful, such as azodiisobutyronitrile and other aliphatic azo compounds of the type having an acylic azo group and an aliphatic carbon atom on each nitrogen, at least one of which is tertiary. If desired various anionic, cationic or charge-transfer catalysts can be employed. For example, sodium methylate can be used to initiate cyanoacrylates. In part, the particular catalyst employed depends upon the ethylenically unsaturated monomer and/or other polymerizable materials employed in the predetermined chemical reaction.

Suitable promoters which can be employed as part of a "redox system" for controlling free-radical polymerization reaction include ascorbic acid, soluble sulfites, hydrosulfites, sulfoxalates, thiosulfates, bisulfites, such as sodium hydrosulfite, sodium metabisulfites, zinc or sodium formaldehyde sulfoxalate, calcium bisulfite, etc. Other redox components include polyvalent metal ions, such as ferrous ammonium sulfate, etc. Various other accelerators, such as tertiary amines (dimethylaniline), etc. can be employed as promoters.

Suitable polymerization inhibitors for controlling free-radical polymerization reactions include aromatic hydroxy containing compounds such as hydroquinone, p-methoxyphenol, catechol, tertiary butyl catechol, tertiary butyl hydroquinone, etc.; copper powder, cuprous chloride, phenothiazine, dinitrobenzene, Methylene Blue, napthylamine, p-phenylenediamine, etc.

Ethylenically unsaturated monomers suitable for use as complementary reagents for cross-linking polymers containing only copolymerizable internally ethylenically unsaturated double bonds include alkyl esters of alpha, beta-ethylenically unsaturated monocarboxylic acids containing from 1 to 18 carbon atoms in the alkyl group, such as methyl acrylate, ethyl acrylate, 2-ethylhexyl acrylate, methyl methacrylate, and ethyl alpha-cyanoacrylate, etc.; alpha, beta-ethylenically unsaturated acids, such as acrylic acid, methacrylic acid and itaconic acid; alpha, beta-ethylenically unsaturated nitriles, such as acrylonitrile, methacrylonitrile and ethacrylonitrile, alpha, beta-ethylenically unsaturated amides, such as methacrylamide, diacetone acrylamide and acrylamide; monovinyl aromatics, such as styrene and vinyl toluene, vinyl halides, such as vinyl chloride and vinyl bromide; diesters of alpha,beta-ethylenically unsautrated dicarboxylic acids, such as dimethyl itaconate; alkyl vinyl ethers, such as methyl vinyl ether and ethyl vinyl ether; alkyl vinyl ketones, such as methyl vinyl ketone, etc.; polyethylenically unsautrated monomers, such as allyl crotonate, allyl acrylate, polyhydric alcohol esters of alpha,beta-ethylenically unsaturated monocarboxylic acids, such as 1,3-butylene dimethacrylate, the diacrylate or dimethacrylate of glycol, diethylene glycol, triethylene glycol, etc.

Complementary reagents suitable for use as curing agents for various polymerizable materials include epoxy resin curing agents, such as maleic anhydride, sodium hydroxide, polyamines, etc.; polyurethane and bischloroformate curing agents such as polyamines (ethylene diamine), hydroxyamines (ethanolamine), polyhydric alcohols (sorbitol), etc.

Catalysts suitable for use as complementary reagents in condensation reactions include catalysts for polyisocyanate reactions, such as tertiary amines, quaternary amines, organotin compounds, etc.; boron trifluoride etherate for epoxy resins, etc.

Enzymes suitable for use as complementary reagents for degrading hydrophilic colloids include proteases, pectinases, collagenases, lipases, alpha-amylase, beta-amylase, amylo - 1,4-glucosidase, amylo-1,6-glucosidase, isoamylase, R-enzyme, etc.

Etchants suitable for use as complementary reagents for degrading films and foils include ferric chloride, tartaric acid, oxalic acid, citric acid, etc.

Suitable materials for buffering enzymatic compositions at a suitable pH include sodium carbonate, calcium phosphate, ferric chloride, oxalic acid, tartaric acid, citric acid, etc.

Suitable materials for use as complementary reagents having a high water of hydration include sodium phosphates, such as dibasic sodium phosphate heptahydrate and dodecahydrate, sodium sulfate decahydrate, etc.

Cross-linking agents suitable for use as complementary reagents include aldehydes, such as paraformaldehyde, trioxane, acrolein, glyoxal, glutaraldehyde, hydroxyadipaldehyde, etc.; light-sensitive tanning agents such as ammonium or potassium dichromate; anhydrides such as maleic anhydride, itaconic anhydride, cyclic adipic anhydride, succinic anhydride; water soluble metal salts, such as calcium chloride, ammonium zirconyl carbonate, zinc ammonium carbonate, etc.; epoxides such as diglycidyl ether of bisphenol A, etc.

Suitable complementary reagents useful as buffers for development of heat developable two-component diazotypes without exposure of two-component diazotype to light include oxalic acid, tartaric acid, citric acid, ferric chloride, etc.

Suitable complementary reagents useful for developing conventional two component diazotypes without exposure of two-component diazotype to light include guanadine carbonate, sodium carbonate, urea, ammonium bicarbonate, etc.

Reactive blowing or foaming agents useful as complementary reagents for forming polyurethanes include azo compounds, such as benzene diazonium chloride, p-morpholino-2,4-dibutoxybenzene diazonium chloride; ammonium salts, such as ammonium bicarbonate; salts having a high water of hydration referred to above; azocarbodiimides, etc.

Inhibitors for azocarbodiimide blowing agents, such as barium salts, reducing agents, benzotriazoles, can be used as complementary reagents.

Suitable carriers for the complementary reagents include hydrophilic polymeric carriers, such as polyvinyl alcohol, granular starches (preferably corn or rice), animal glue, gelatin, gum arabic, gum tragacanth, carboxypolymethylene, polyvinyl pyrrolidone, Carbowaxes, etc.; hydrophilic monomeric materials, such as sorbitol, mannitol, dextrose, tartaric acid, urea, etc.; hydrophobic carriers, such as polystyrene, Pliolite VTL (butadiene-styrene copolymers), polymethyl methacrylate, etc., inorganic carriers, such as iron oxide, sand, etc.

The particular carrier or carriers employed depend in part on the complementary reagent to be deposited and on the predetermined chemical reaction. In general, the carrier should be selected in a manner to prevent undesirable side reactions between the carrier and complementary reagent or between carrier and components of the predetermined chemical reaction. In some cases, a component of a developing powder can function as an inert carrier and in others as the complementary reagent. For example, sorbitol is an excellent inert diluent carrier for free-radical polymerization inhibitors or enzymes and complementary reagent for curing or extending polyurethane elastomers.

The developing powders useful in this invention contain particles having a diameter or dimension along at least one axis from about 0.3 to 40 microns being best for light-sensitive layers of 0.4 to 10 microns. Maximum particle size is dependent on the thickness of light-sensitive layer while minimum particle size is independent of layer thickness. Electron microscope studies have shown that developing powders having a diameter 25 times the thickness of the light-sensitive layer cannot be permanently embedded in light-sensitive layers and, generally speaking, best results are obtained where the diameter of the powder particle is less than about 10 times the thickness of the light-sensitive layer. For the most part, particles over 40 microns are not detrimental to image development provided the developing powder contains a reasonable concentration of powder particles under 40 microns, which are less than 25 times, and preferably less than 10 times, the light-sensitive layer thickness. However, other things being equal, the larger the developer powder particles (above 10 microns), the lower the $R_d$ of the developed image. For example, when Xerox 914 Toner, classified to contain (a) all particles under 1 micron, (b) 1 to 3 micron particles, (c) 3 to 10 micron particles, (d) 10 to 18 microns, and (e) all particles over 18 microns, was used to develop positive acting 1 micron thick lecithin light-sensitive elements after the same exposure, the images had a $R_{dp}$ of (a) 0.83, (b) 0.95, (c) 0.97, (d) 0.32, and (e) 0.24, respectively.

Although particles over 40 microns are not detrimental to image development, the presence of particles under 0.3 micron diameter along all axes can be detrimental to proper image formation. In general, it is preferable to employ developing powders having substantially all powders having a diameter along at least one axis not less than 0.3 micron, preferably more than 0.5 micron, since particles less than 0.3 micron tend to embed in non-image areas.

As the particle size of the smallest particles increases, less exposure to actinic radiation is required to clear the background. For example, when Xerox 914 Toner, classified to contain (a) all particles under 1 micron, (b) 1 to 3 micron particles, (c) 3 to 10 micron particles, (d) 10 to 18 micron particles and (e) over 18 micron particles, was used to develop the light-exposed portions of positive-acting 1 micron thick lecithin light-sensitive elements, the exposed portions had a $R_{dp}$ of (a) 0.26, (b) 0.23, (c) 0.10, (d) 0 and (e) 0 after equal exposures. By suitably increasing the exposure time, the $R_{dp}$ of the non-image areas was reduced to substantially zero with particles (a), (b) and (c). Other things being equal, the larger the particle size of the developing powder used in this invention, the higher the concentration of complementary reagent available to initiate said predetermined chemical reaction.

In somewhat greater detail, the developing powder is applied directly to the light-sensitive layer, while the powder receptive areas of said layer are in at most only a slightly soft condition and said layer is at a temperature below the melting point of the layer and powder. The powder is distributed over the area to be developed and physically embedded into the stratum at the surface of the light-sensitive layer, preferably mechanically by force having a lateral component, such as to-and-fro and/or circular rubbing or scrubbing action using a soft pad, fine brush or even an inflated balloon. If desired, the powder may be applied separately or contained in the pad or brush. The quantity of powder is not critical provided there is an excess available beyond that required for full development of the area, as the development seems to depend primarily on particle-to-particle interaction rather than brush-to-surface or pad-to-surface forces to embed a layer of powder particles substantially one particle thick (monoparticle layer) into a stratum at the surface of the light-sensitive layer. Only a single stratum of powder particles penetrates into the powder-receptive areas of the light-sensitive layer even if the light-sensitive layer is several times thicker than the developer particle diameter. This, of course, makes it possible to carefully control the amount of complementary reagent delivered to the layer capable of undergoing said predetermined chemical reaction.

The pad or brush used for development is critical only to the extent that it should not be so stiff as to scratch or scar the film surface when used with moderate pressure with the preferred amount of powder to develop the film. Ordinary absorbent cotton loosely compressed into a pad about the size of a baseball and weighing about 3 to 6 grams is especially suitable. The developing motion and force applied to the pad during development is not critical.

The speed of the swabbing action is not critical other than that it affects the time reqired; rapid movement requiring less time than slow. The preferred mechanical action involved is essentially the lateral action applied in ultrafine finishing of a wood surface by hand sanding or steel wooling.

Hand swabbing is entirely satisfactory, and when performed under the conditions described above, will reproducibly produce the maximum density which the material is capable of achieving. That is, the maximum concentration of particles per unit area will be deposited under the prescribed conditions, dependent upon the physical properties of the material such as softness, resiliency, plasticity, and cohesivity. Substantially the same results can be achieved using a mechanical device for the powder application. A rotating or rotating and oscillating, cylindrical brush or pad may be used to provide the described brushing action and will produce a substantially similar end result.

After the application of developing powder, excess developing powder remains on the surface which has not been sufficiently embedded into, or attached to, the layer. This may be removed in any convenient way, as by wiping with a clean pad or brush usually using somewhat more force than employed in mechanical development, by vacuuming, by vibrating, or by air doctoring and recovered. For simplicity and uniformity of results, the excess powder usually is blown off using an air gun having an air-line pressure of about 20 to 40 p.s.i. The gun is preferably held at an angle of about 30 to 60 degrees to the surface at a distance of 1 to 12 inches (3 to 8 preferred). The pressure at which the air impinges on the surface is about 0.1 to 3, and preferably about 0.25 to 2, pounds per square inch. Air cleaning may be applied for several seconds or more until no additional loosely held particles are removed. The remaining powder should be sufficiently adherent to resist removal by moderately forceful wiping or other reasonably abrasive action.

LAYER CAPABLE OF UNDERGOING PREDETERMINED CHEMICAL REACTION

The layer comprising a composition capable of undergoing a predetermined chemical reaction can be produced in numerous ways. For example, the layer can be formed by coating the composition on a suitable substrate (glass, metal, ceramic, paper, plastic, etc.) by any suitable means dictated by the nature of the material (hot-melt draw down, spray, roller coating or air knife, flow, dip or whirler coating from solution, curtain coating, extrusion as a hot melt or thin film, etc.) to produce a reasonably smooth layer on the substrate or object. If desired, any of these techniques can be employed to apply directly the composition in layer form to a second layer bearing complementary reagent powder particles in image-wise configuration. If desired, the layer capable of undergoing a predetermined chemical reaction can be produced in film or sheet form by any suitable means, such as by coating or extrusion and laminated to a suitable object, or employed as a free film or sheet, such as in the case of metal or plastic films, foils and sheets.

The substrates or objects to be coated with the layer comprising a composition capable of undergoing a predetermined chemical reaction are preferably relatively smooth. The supports can be opaque or transparent. Suitable substrates include materials, such as steel and aluminum plates, sheets and foils, glass, paper, cellulose esters, such as cellulose acetate, cellulose propionate, cellulose butyrate, etc., polyethylene terephthalate, nylon, polystyrene, polyethylene, polypropylene, corona discharge treated polyethylene or polypropylene, Tedlar PVF (polyvinyl fluoride), polyvinyl alcohol, amylose, ceramic, haydite blocks, etc. If desired, the supports or objects can be subbed with various other materials of the types employed as substrates or supports.

As indicated above, there are a wide number of compositions capable of undergoing a predetermined chemical reaction and complementary reagents for controlling said predetermined chemical reactions suitable for use in the process of this invention. For example, various free-radical addition polymerization reactions can be controlled by the use of complementary reagents, such as (1) polymerization inhibitors, (2) polymerization catalysts, (3) components of redox catalyst systems (accelerators or reducing agents) and (4) polymerizable monomers, etc.

Typically, each of the free-radical polymerizable compositions suitable for use in this invention will contain from about 10 to 99.99% by weight of one or more of the following components:

(a) polymeric material and ethylenically unsaturated monomer,
(b) polymerizable polymeric material containing homopolymerizable groups,
(c) polymerizable monomeric material containing homopolymerizable groups or partially polymerized monomeric material,
(d) highly viscous monomeric and/or polymeric material containing no terminal ethylenic double bonds, and no internal homopolymerizable ethylenically unsaturated double bonds, etc.

Compositions of types (a), (b) or (c) can be controlled with (1) polymerization inhibitors,
(2) polymerization catalysts, and
(3) components of a redox system and/or accelerator.

Compositions of type (d) can be controlled by complementary reagents comprising monomers containing terminal ethylenic double bonds (in which case the polymeric material or monomeric material contains a suitable free-radical catalyst). Under appropriate conditions, compositions of types (a) and (c), which do not contain polyunsaturated monomers, can be controlled by complementary reagents comprising monomers containing two or more terminal ethylenic double bonds.

Polymerizable compositions of type (a) can include polymers as polyesters formed by the reaction of polyhydric alcohols, such as polyethylene glycols of the formula $HO(CH_2)_nOH$ wherein $n$ is a whole number from 2 to 10 inclusive and polycarboxylic acids or anhydrides such as hexahydroterephthalic acid, sebacic acid, maleic acid, maleic anhydride, adipic acid, etc.; nylons or polyamides, such as N-methoxymethyl polyhexamethylene adipamide; vinylidene chloride copolymers, such as vinylidene chloride/acrylonitrile; vinylidene chloride/methacrylate, vinylidene chloride/ vinyl acetate copolymers, etc.; ethylene/vinyl acetate copolymers; cellulose or starch ethers, such as methyl cellulose, ethyl cellulose, cyanoethyl starch, etc.; polyethylene; synthetic rubbers, such as butadiene/acrylonitrile copolymers, chloro-2-butadiene-1,3,polymers, etc.; cellulose and starch esters, such as cellulose acetate, cellulose acetate succinate, cellulose acetate butyrate, starch acetate, etc.; polyvinyl esters, such as polyvinyl acetate/acrylate, polyvinyl acetate/methacrylate, polyvinyl acetate, etc.; polyacrylate and alpha-alkyl polyacrylate esters, such as polyacrylate, polymethyl methacrylate, polyethyl methacrylate, etc.; high molecular weight polyethylene oxides or polyalkylene glycols having average molecular weights from about 4,000 to 10,000 and higher; polyvinyl chloride homopolymer and copolymers, such as polyvinyl chloride/acetate, etc.; polyvinyl acetals, such as polyvinyl butyral, polyvinyl formal, etc.; polyformaldehydes; polyurethanes; polycarbonates; polystyrenes, etc.

Suitable addition polymerizable ethylenically unsaturated compounds which can be used with the above-described polymers in composition (a) include styrene, vinyl toluene, alkyl meth(acrylates), such as methyl methacrylate, ethyl acrylate or hydroxyethyl methacrylate, alkylene or polyalkylene glycol diacrylates prepared from an alkylene glycol of 2 to 15 carbons or a polyalkylene ether glycol of 1 to 10 ether linkages, unsaturated esters of polyols, particularly such esters of the alpha-methylene carboxylic acids, such as ethylene diacrylate, diethyl glycol diacrylate, glycerol diacrylate, glycerol triacrylate, ethylene dimethacrylate, 1,3-propanediol dimethacrylate, 1,2,4-butanetriol trimethacrylate, 1,4 - cyclohexanediol diacrylate, 1,4-benzenediol dimethacrylate, pentaerythritol tetramethacrylate, 1,3-propanediol diacrylate, 1,5-pentanediol dimethacrylate, the bis-acrylates and methacrylates of polyethylene glycols of molecular weight 200–500, and the like; unsaturated amides, particularly those of the alpha-methylene carboxylic acids, and especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide. di(alpha - methacrylamidopropoxy)ethane, beta-methacrylamidoethyl methacrylate, N-(beta-hydroxyethyl)-beta-(methacrylamido) ethyl acrylate and N,N-di(beta-methacrylyloxyethyl) acrylamide; vinyl and esters such as divinyl succinate, divinyl adipate, divinyl phthalate, diallyl phthalate, divinyl terephthalate, divinyl benzene-1,3-disulfonate and divinyl butane-1,4-disulfonate; unsaturated aldehydes, such as sorbaldehyde (hexadienal), etc.

Polymerizable compositions of type (b) include polyvinyl cinnamate, cellulose cinnamate, copolymers of vinyl cinnamate and other copolymerizable ethylenically unsaturated monomers, allyl starch or cellulose, polyallyl methacrylate, etc.

Polymerizable compositions of type (c) include monomeric compositions containing one or more polymerizable monomers of the type suitable for use in polymerizable compositions of type (a) and/or suitable for use as complementary reagents for cross-linking polymers containing only copolymerizable internally ethylenically unsaturated double bonds of type (d).

Polymerizable compositions of type (d) include polyesters of alpha, beta-ethylenically unsaturated alpha, beta-dicarboxylic acids (maleic acid, maleic anhydride, fumaric acid) and polyhydric alcohols, vicinal acryloxyhydroxy and vicinal acryloxy-halo long chain compounds having a carboxyl group esterified with a monohydroxy group on the beta carbon atom of the acryloxy group of the type described in U.S. Pats. 3,190,899, 3,304,315 and 3,337,588.

The above polymerizable compositions can contain fillers, dyes and/or pigments, such as titanium dioxide, colloidal carbon, graphite, phosphor particles, clays, fiber glass, silica, sand, metal powders such as aluminum, copper, magnetic iron, etc.

As indicated above, the degradation and insolubilization of colloids can be controlled by the use of complementary reagents. For example, the degradation of hydrophilic colloids in layer form can be controlled by the use of (1) enzymes, (2) buffering agents, (3) salts having a high water of hydration, (4) acidic or alkaline materials, etc. The tanning or insolubilization of colloids can be controlled by treatment with suitable tanning or cross-linking agents.

Typical degradable hydrophilic colloids include animal proteins, such as gelatin, glue and casein or vegetable proteins, such as soybean, pea, bean, corn, cotton seed and potato, which can be controlled by proteases; polysaccharides, particularly starches which may be native starches, modified starches or low D.S. (degree of substitution) starches, such as native corn starch, tapioca starch, rice starch, waxy corn starch, potato starch, wheat starch, amylose and amylopectin fractions of starches, starches previously microns, preferably from 0.5 to 15 microns with powders of the order to 1 to 7 modified by treatment with enzymes, hypochlorites or acid, derivatives such as starch acetates, carboxymethyl starch, hydroxyethyl starch, hydroxypropyl starch, etc., that can be controlled by carbohydrases, pectins, gum arabic, collagens, etc.

Mixtures of the degradable hydrophilic colloids and enzymes capable of degrading the hydrophilic colloid can be controlled by deposition of buffering agents which establish the proper pH for optimum utilization of enzyme or by salts having a high water of hydration, to provide the necessary medium for the reaction. If desired, the degradation of hydrophilic organic films, such as starches, or metallic films or foils can be controlled by the deposition of acidic or alkaline materials which are capable of degrading the hydrophilic organic material or metallic surface. Any of the degradable hydrophilic organic materials can be degraded on the surface of a substrate in layer form or when used to encapsulate suitable colorants such as employed in the NCR carbonless papers.

Natural or synthetic polymers can be hardened and/or insolubilized by treatment with suitable tanning or cross-linking agents for the colloid. The insolubilization of synthetic polymers having free reactive groups such as hydroxyl groups, carboxyl groups, amino or amido groups, etc., can be controlled with appropriate reactive cross-linking or tanning agents. To some extent, the complementary agents will depend upon the particular colloid employed. Suitable polymers include hydroxyl containing polymers including polyvinyl alcohol, hydroxyethyl cellulose, copolymers of allyl alcohol and ethylenically unsaturated comonomers, starches, etc.; carboxyl polymers such as carboxymethyl cellulose, copolymers of alpha, beta-ethylenically unsaturated carboxylic acids (methacrylic acid, acrylic acid, maleic anhydride) and ethylenically unsaturated comonomers (styrene, acrylate esters, methacrylate esters, acrylonitrile, etc.), gum arabic, etc.; amido or amino containing polymers such as gelatin, copolymers of alpha, beta-ethylenically unsaturated amides (acrylamide, methacrylamide, etc.) and ethylenically unsaturated comonomers (styrene, alkyl esters of alpha, beta-ethylenically unsaturated acids), polyethyleneimine, etc.

Two-component diazotypes can be developed in image-wise configuration without exposure of the diazotype to actinic radiation by the use of suitable complementary reagents. For example, heat developable two-component diazotypes of the type described in U.S. Pats. 3,420,666, 3,389,996, etc., can be formulated with a typical diazonium compound (diazonium salt of N,N-dimethylaminobenzenediazonium chlorozincate, etc.), a suitable azo coupling component such as 6,7-dihydroxynaphthalene-2-sulphonate, phloroglucinol, etc.; a suitable acid stabilizer such as citric acid, diammonium citrate, disodium acid phosphate, etc.; and alkaline generating agent such as urea, sodium salt of trichloroacetic acid, dicyandiamide, dicyandiamidine, etc. The heat developable diazotypes of this type can be developed by treatment with complementary reagents comprising an acidic compound and heated to development temperature to establish an image in the areas where no acidic material is in contact with the two-component diazotype.

Conventional two-component diazotypes containing substantially the same compositions as the heat developable two-component diazotypes except for the omission of alkaline generating agents can be developed with complimentary reagents comprising an alkaline material in a concentration sufficient to overcome the stabilizing function of the acidic components of the two-component diazotypes thereby forming an image.

As indicated above, various other predetermined chemical reactions can be controlled by the use of a suitable complementary reagent. As illustrated below in the examples, the layer comprising a composition capable of undergoing a predetermined chemical reaction and the layer comprising the complementary reagent are brought into contact and the predetermined chemical reaction is carried out in the areas corresponding to the image-wise presence or absence of the powder particles of the second layer. Various different methods may be employed for initiating or carrying out the reaction. For example, polymerizable compositions and most cross-linking reactions can be initiated by heating the compositions to a suitable initiating temperature for the catalyst system employed. Alternatively, when using inhibitors to control polymerization reactions, it may be desirable to initiate the predetermined chemical reaction before bringing the two layers into contact. Dichromate cross-linkers are preferably initiated by uniform actinic radiation. Degradation reactions can be initiated in many cases merely by providing moist warm air or heating the composition to a suitable temperature.

The two layers are separated after said predetermined chemical reaction is initiated, or preferably after the predetermined chemical reaction is completed. The image areas defined by the completed predetermined chemical reactions are of three types. In those cases where the predetermined chemical reaction is a polymerization reaction, hardening reaction, cross-linking reaction, etc., the image areas defined by the completed predetermined chemical reaction can be characterized as having a harder, less soluble character than the unreacted areas, i.e. the unreacted areas have a lower melting point and greater solubility than the reacted areas. In those cases where the predetermined chemical reaction is a degradation reaction or etching reaction, the image areas defined by the completed predetermined chemical reaction can be characterized as being softer and/or as having a greater solubility than the unreacted areas. In those cases, where the predetermined chemical reaction is primarily a color change, such as in the various diazotype reactions, the physical characteristics of the image areas defined by the completed predetermined chemical reaction and the non-image areas are of no import.

In general, when the predetermined chemical reaction is of the first type (polymerization reaction, hardening or cross-linking) the unreacted non-image materials are preferably removed in an appropriate manner to establish usefully defined image areas. Typically, the unreacted materials are removed with a solvent for the unreacted materials or mechanically, such as by abrasion or stratum transfer of the unreacted materials to a suitable receiving layer. If the latter technique is employed, the transferred material can be supplemented with one or more chemicals necessary to effect the original predetermined chemical reaction and the predetermined chemical reaction can be carried out to form a complementary image on the receiving layer, corresponding to the first image formed by said predetermined chemical reaction. If the predetermined chemical reaction is a degradation reaction or etching reaction, the degradation products and reactants used to form said degradation products are preferably removed by washing out with an appropriate solvent and/or removed mechanically.

Any of the above compositions capable of undergoing a predetermined chemical reaction can contain suitable fillers, dyes and/or pigments, such as titanium dioxide, colloidal carbon, graphite, phosphor particles, clays, fiber glass, silica, sand, metal powders such as aluminum, copper, magnetic iron, etc., polymeric particles such as polyvinyl acetate, rice starch, etc.

The following examples are merely illustrative and should not be construed as limiting the scope of this invention.

EXAMPLE I

This example illustrates the use of an accelerator to control the free radical polymerization of an addition polymerizable layer. A layer containing the accelerator in image-wise configuration was prepared by coating a sheet of grained aluminum with a solution comprising .64 gram Staybelite Ester #10 (partially hydrogenated rosin acid ester of glycerol), .16 gram benzil and .096 gram 4-methyl-7-dimethylaminocoumarin, dissolved in 100 ml. Chlorothene (1,1,1-trichloroethane), placing the coated aluminum sheet in contact with a negative transparency, exposing the element to actinic radiation in a vacuum frame for about one minute, removing the transparency from the sensitized aluminum plate, and physically developing with a powder comprising 10 grams N,N-dimethyl-p-phenylazoaniline (the accelerator) and 0.25 gram tri-calcium phosphate (employed as a flow agent for the accelerator) which had been ball-milled for about four days. The accelerator was embedded into the unexposed areas of the light-sensitive Staybelite layer by rubbing a wad of cotton over the surface of the element using essentially the same force as employed in the ultrafine finishing of wood. The non-embedded accelerator powder was removed with a clean wad of cotton.

The polymerizable composition was prepared by mixing 50 grams Paraplex P 462 (polyester of an alpha, beta-ethylenically unsaturated alpha, beta-dicarboxylic acid and a polyhydric alcohol, dissolved in styrene) with 1.5 grams benzoyl peroxide. Ten grams of the polymerizable composition was mixed with two grams Cab-O-Sil (silica) and placed in a vacuum dessicator for five minutes to remove air bubbles from the mix. The thickened polymerizable composition was doctored out as a layer onto a sheet of cellophane, and placed in face-to-face contact with the accelerator layer for one hour at room temperature. The cellophane layer was stripped off the polymerizable layer and the polymerizable composition was washed with trichloroethylene to remove the unpolymerized material. The washed layer contained a polymeric positive relief image of the accelerator powder image.

Essentially the same results are obtained by replacing the Staybelite ester sensitizer composition described above with (1) 1.25 grams Staybelite Ester #5 (partially hydrogenated rosin ester of glycerol), .1875 gram benzil and .3125 gram 4-methyl-7-dimethylaminocoumarin, dissolved in 100 ml. Chlorothene, (2) 1.25 grams Staybelite resin F (partially hydrogenated rosin acids), .1 gram benzil and .3125 gram 4-methyl-7-dimethylaminocoumarin, dissolved in 100 ml. Chloroethene, (3) 1.25 grams wood rosin, .15 gram benzil and .3125 gram 4-methyl-7-dimethylaminocoumarin, dissolved in 100 ml. Chloroethene, (4) 1.25 grams abietic acid, .15 gram benzil and .3125 gram 4-methyl-7-dimethylaminocoumarin, dissolved in 100 ml. Chloroethene and (5) 5 grams of the ethanol-insoluble fraction of soybean lecithin and 0.2 gram benzil, dissolved in 100 ml. carbon tetrachloride.

EXAMPLE II

Example I was repeated with essentially the same results, except that the accelerator layer-cellophane sandwhich was heated at about 100° C. for a few minutes to speed up the polymerization and the unpolymerized material was removed by washing with benzene. The washed aluminum plate was then placed in an oven at about 100° C. for about five minutes to complete the polymerization. The clearly visible letters corresponding to a polymeric positive of the accelerator powder image was inked on a stamped pad and an impression made on paper yielding the desired image.

EXAMPLE III

This example illustrates the use of a polymerization inhibitor to control the free radical polymerization of an addition polymerizable composition. The layer containing the polymerization inhibitor in image-wise configuration was prepared by coating a 4 mil polyester film with a solution comprising .64 gram Staybelite Ester #10, .16 gram benzil and .096 gram 4-methyl-7-dimethylaminocoumarin, dissolved in 100 ml. Chloroethene, placing the coated polyester sheet in contact with a negative transparency, exposing the element to actinic radiation in a vacuum frame for about one minute, removing the transparency from the sensitized polyester film, and physically developed by rubbing a wad of cotton containing hydroquinone powder (the polymerization inhibitor) which had been ball-milled for about 16 hours. The polymerization inhibitor was embedded into the unexposed areas of the light-sensitive layer using essentially the same force as employed in ultrafine finishing of wood. The non-embedded inhibitor powder was removed with a clean wad of cotton.

The polymerizable composition was prepared by mixing 100 grams Paraplex P 462 with 3 grams of benzoyl peroxide, dissolved in 100 ml. styrene, followed by adding 16 drops of a 10% dimethylaniline solution in styrene. Ten grams of this composition was mixed with 2 grams of Cab-O-Sil and placed in a vacuum dessicator for five minutes to remove air bubbles from the mix. The thickened polymerizable composition was doctored as a layer onto a grained aluminum sheet and the powdered hydroquinone image placed in face-to-face contact with the polymerizable layer for 30 minutes before removing the powdered hydroquinone layer from the grained aluminum layer. The polymerizable composition was washed in benzene giving rise to a negative image of the hydroquinone powder particles, i.e. polymerization took place in the areas where no hydroquinone was in contact with the polyester. The grained aluminum element was placed in a 100° C. oven to complete the cure of the polyester.

EXAMPLE IV

This example illustrates the use of polymerization inhibitor to control the free radical polymerization of an addition polymerizable composition where the polymerizable composition is applied in layer form to the layer containing the embedded inhibitor particles and the element is mounted on a wood block prior to the completion of the polymerization of the polymerizable composition. A powder image containing powder particles containing 18% by weight hydroquinone was formed in the manner described in Example III using hydroquinone developer powder prepared by ball milling a composition comprising 18 parts by weight hydroquinone with 82 parts by weight Pliolite VTL (butadiene-styrene copolymer) for about 16 hours.

A polymerizable composition was prepared by mixing 30 grams of a composition comprising polyester of alpha, beta-ethylenically unsaturated alpha, beta-dicarboxylic acid and polyhydric alcohol in styrene with one gram benzoyl peroxide and 1.5 grams Cab-O-Sil. After 10 drops of 10% dimethylaniline in styrene was added to the polymerizable composition, it was doctored over the 18% by weight hydroquinone powder image, which had been prepared from a negative working transparency. Six minutes after the polymerizable composition was doctored onto the hydroquinone image layer, a wood block was placed onto the partially gelled polymerizable composition and the element (wood block-polymerizable layer-hydroquinone image) was placed in an oven at 60° C. after 20 minutes in the oven, the element was removed from the oven and the hydroquinone layer stripped from the wood block leaving the polymerized material attached to the wood block. The polymer coated side of the wood block was washed with benzene to remove the unpolymerized material yielding a positive of the negative hydroquinone powdered image. The polymeric side of the wood block was inked by rubbing a roller bearing a tacky proofing ink across the block surface. The resultant inked plate was then brought into contact with a sheet of paper to print a positive of the original negative transparency.

The depth of the polymerized layer was readily adjusted. As the concentration of hydroquinone in the developing powder was increased, the depth of the unpolymerized layer increased.

EXAMPLE V

This example illustrates development of a heat developable diazo-type without exposing the two-component diazotype to light in accordance with this invention. A layer containing an acidic material in image-wise configuration was prepared in the manner described in Example I, except that a ferric chloride developing powder was prepared by ball-milling 50 grams ferric chloride with 50 grams Pliolite VTL.

A heat developable diazotype is developed in image-wise configuration corresponding to the acidic image described in the preceding paragraph by coating a transparent, light-weight rag paper with a composition containing 1.0 part by weight citric acid, 2.0 parts by weight magnesium chloride, 6.0 parts by weight dicyandiamide, 8 parts by weight dicyandiamidine, 1.8 parts by weight 4-morpholinobenzene diazonium chlorozincate, 2.4 parts by weight 2 (m-hydroxyphenoxy)ethanol, 4.0 parts by weight polyvinyl alcohol, 4.0 parts by weight silica and 5 parts by weight polyvinyl acetate emulsion in a total of 100 parts by weight water, drying the paper, bringing the paper into face-to-face contact with the layer comprising acidic particles, moisturizing the element by placing it over a steam bath, and heating the element at a temperature of 121 to 177° C., forming a brown sepia-like image in the areas where no acidic powder particles are in contact with the heat developable diazotype. The uncoupled diazonium salt remaining on the paper substrate can be destroyed by exposing the diazotype to uniform ultraviolet irradiation, if desired.

Essentially the same results are obtained with a conventional two component diazotype by replacing the ferric chloride developing powder with sodium hydroxide developing powder, prepared by grinding equal parts by weight sodium hydroxide and micronized Piccolastic D–150 (styrene polymer) with a mortar and pestle, and by omitting the dicyandiamide and dicyandiamidine from the heat developable diazotype. In this case a sepia-like image is obtained in the areas corresponding to the sodium hydroxide developing powder upon steaming the element.

EXAMPLE VI

This example illustrates the preparation of a gelatin relief employing a protease enzyme as the complementary reagent. A layer containing protease enzyme developing powder in image-wise configuration was prepared by coating a substrate with 0.96 gram Staybelite Ester #10, .24 gram benzil and .144 gram 4-methyl-7-dimethylaminocoumarin, dissolved in 100 ml. Chlorothene, placing the coated sheet in contact with a transparency, exposing the element to actinic radiation in a vacuum frame for about one minute and developing with ball-milled protease enzyme in the manner described in Example I.

A gelatin coated substrate was prepared by coating a 10% aqueous solution of gelatin on a paper sheet with a wire wrapped rod. A gelatin relief image is formed by bringing the paper bearing the gelatin layer into face-to-face contact with the layer comprising the protease enzyme to form a sandwich element, moisturize the element by holding it over a steam bath, separating the two layers and washing the gelatin layer with cold water to dissolve digested gelatin. The gelatin relief image is a negative of the powdered enzyme protease layer. If desired, the gelatin relief image can be reinforced by dipping in a bath containing a suitable cross-linking or tanning agent.

A positive gelatin relief is formed by replacing the protease developing powder with trioxane, heating the sandwich element and washing out the uncross-linked gelatin with hot water.

A positive image is also formed by replacing the protease developing powder with ammonium dichromate developing powder, bringing the dichromated developing powder layer into face-to-face relationship with the gelatin layer, moisturizing the sandwich element to dissolve and imbibe the dichromated powder into the gelatin layer, separating the two layers, exposing the gelatin layer to uniform ultraviolet light irradiation and washing out the untanned gelatin with hot water.

EXAMPLE VII

This example illustrates the preparation of a polysaccharide relief image. The powdered image comprising complementary reagent is prepared in the manner described in Example VI using an enzyme preparation comprising alpha and beta amylase powder in place of the protease powder and the polysaccharide layer is formed by coating a ten percent amylose solution in dimethyl sulfoxide on a sheet of paper. A relief image is formed by bringing the two layers into face-to-face position, moisturizing the element, separating the two layers and washing the polysaccharide layer with water.

EXAMPLE VIII

This example illustrates the method of forming a decorative epoxide coating. A layer containing epoxide curing catalyst in image-wise configuration is prepared by coating a sheet of Mylar with a solution comprising .64 gram chlorowax LMP (a resinous chlorinated paraffin containing 70% by weight chlorine), .35 gram benzil and .16 gram 4-methyl-7-dimethylaminocoumarin, dissolved in 100 ml. Chlorothene, bringing the coated sheet in contact with a negative transparency, exposing the element to actinic radiation in a vacuum frame for about 75 seconds, removing the transparency from the Mylar coated sheet and physically developing with powder particles of hexamethylene diamine. The epoxide layer is formed by coating a metal base with 100 parts by weight Epon 1001 (condensation product of epichlorohydrine and bis-phenol A) and 10 parts by weight cobalt blue. The epoxide resin is cured in the areas corresponding to the image-wise configuration of the hexamethylene diamine powder on the first layer by bringing the two layers into face-to-face contact for about five minutes, separating the two layers and washing off the uncured epoxide coating.

EXAMPLE IX

A water-developable intaglio printing plate was formed using polymerization inhibitor to control the free radical polymerization of a partially polymerized monomeric composition. The layer containing the polymerization inhibitor, in image-wise configuration, was prepared in the manner described in Example III using hydroquinone developing powder prepared by ball-milling 3 grams hydroquinone with 47.5 grams Pliolite VTL. A composition comprising 10 grams acrylonitrile, 10 grams butylene dimethacrylate, 80 grams hydroxypropyl methacrylate, 2 grams benzoyl peroxide, .6 gram Cab-O-Sil and 30 drops dimethylaniline was doctor coated onto a hot support maintained on a hot plate at 60° C. The polymerizable composition was permitted to polymerize for about 30 seconds before the powdered hydroquinone sheet was carefully brought into contact with the polymerizable layer. The hydroquinone imaged sheet was removed from the polymerizable layer after two minutes. The polymerized layer was washed with water and post-cured at 100° C. yielding an intaglio printing plate.

EXAMPLE X

This example illustrates the preparation of textured vinyl resilient tiles, wherein an inhibitor of a blowing agent is deposited by deformation imaging. A layer containing a benzotriazole blowing agent inhibitor in image-wise configuration is prepared by coating a sheet of gelatin coated paper with a solution comprising .64 gram Staybelite Ester #10, .30 gram benzil and .16 grams 4-methyl-7-dimethylaminocoumarin, dissolved in 100 mls. Chlorothene, bringing the coated sheet in contact with a transparency, exposing the element to actinic radiation in a vacuum frame for about 75 seconds, removing the transparency from the gelatin coated sheet and physically developing with benzotriazole powder particles. A textured vinyl tile is produced by applying a polyvinyl chloride plastisol, containing 2% by weight of an azocarbodiimide blowing agent, to the benzothiazole side of the imaged gelatin layer, heating the element above the decomposition temperature of azocarbodiimide and gelling temperature of the plastisol, cooling the element to room temperature and separating the gelatin coated sheet from the cured polyvinyl chloride plastisol. The polyvinyl chloride plastisol bears raised areas corresponding to the areas where there is no benzotriazole on the surface of the gelatin coated sheet.

Essentially the same results are obtained by replacing the benzotriazole complementary reagent with any of the blowing agent inhibitors of U.S. Pat. 3,293,094 or by replacing the carbodiimide blowing agent with any of the blowing agents of U.S. Pat. 3,293,094.

EXAMPLE XI

This example illustrates the preparation of a planographic printing plate suitable for use without an aqueous fountain solution, of the type described in U.S. Pat. 3,511,178, wherein a catalyst for the cure of a polysiloxane is deposited by deformation imaging. A layer containing an aluminum octoate polysiloxane catalyst in image-wise configuration is prepared by coating a sheet of gelatin coated paper with a solution comprising .96 gram Staybelite Ester #10, .45 gram benzil and .24 gram 4-methyl-7-dimethylaminocoumarin, dissolved in 100 mls. Chlorothene, placing the coated sheet in contact with a transparency, exposing the element to actinic radiation in a vacuum frame for about 60 seconds, removing the transparency from the gelatin coated sheet and physically developing with aluminum octoate powder particles. A planographic printing plate capable of printing without aqueous fountain solution is produced by flow coating a solution of 20 parts by weight of a silicone gum (a high molecular weight linear polysiloxane, such as commercially available as "G.E. RTV 108"), and 80 parts by weight of heptane, on a sheet of ungrained aluminum, air drying the element, bringing the aluminum octoate imaged element into face-to-face relationship with the polysiloxane coated aluminum sheet, heating the element at a temperature of about 300 to 400° F. for 1 to 15 minutes, separating the two elements and removing the uncured polysiloxane with a solution of two parts by weight n-butyl acetate, five parts by weight n-propyl alcohol and one parts by weight water leaving the cured polysiloxane only in the areas corresponding to the aluminum octoate on the imaged element. This aluminum plate is capable of being printed without aqueous fountain solution on a planographic press after thorough rinsing with water and air drying.

Essentially the same results are obtained by replacing the aluminum octoate with aluminum stearate, cadmium naphthanate, etc.

Essentially the same results are obtained by replacing the polysiloxane resin with any of those disclosed as suitable in U.S. Pat. 3,511,178.

EXAMPLE XII

This example illustrates the use of a cationic addition polymerization catalyst as a control agent. A layer containing an $Al_2(SO_4)_3 \cdot 3H_2SO_4 \cdot 7H_2O$ cationic polymerization catalyst in image-wise configuration is prepared by coating a sheet of Mylar with a solution comprising .64 gram Staybelite Ester #10, .30 gram benzil and .16 gram 4-methyl-7-dimethylaminocoumarin, dissolved in 100 mls. Chlorothene, bringing the coated sheet in contact with a transparency, exposing the element to actinic radiation in a vacuum frame for about 75 seconds, removing the transparency from the Mylar coated sheet and physically developing with the cationic aluminum sulfate catalyst. A polyvinyl-n-butyl layer is formed in the areas corresponding to the presence of the aluminum sulfate catalyst by applying a composition comprising vinyl n-butyl ether thickened with Cab-O-Sil to the aluminum sulfate image with a doctor blade, permitting the polymerization to go to completion and washing out the unpolymerized vinyl n-butyl ether from the Mylar base with pentane.

The aluminum sulfate catalyst is prepared by dissolving 10 grams of aluminum sulfate octadecahydrate and 3.3 grams concentrated sulfuric acid in water, evaporating the mixture to dryness and heating the residue in an oven at 170° C. for four hours.

Since many embodiments of this invention may be made and since many changes may be made in the embodiments described, the foregoing is interpreted as illustrative only and my invention is defined by the claims appended hereafter.

What is claimed is:

1. The process for carrying out a predetermined chemical reaction in image-wise configuration which comprises:
    (1) exposing to actinic radiation in image-receiving manner a solid, light-sensitive organic layer capable of developing a $R_d$ of 0.2 to 2.2;
    (2) continuing the exposure to establish a potential $R_d$ of 0.2 to 2.2;
    (3) applying to said layer of organic material, free flowing powder particles having a diameter, along at least one axis of at least about 0.3 micron but less than 25 times the thickness of said organic layer, said powder particles comprising a component which, in minor proportions, exerts a major influence on the course of a predetermined chemical reaction;
    (4) while the layer is at a temperature below the melting points of the powder and of the organic layer, physically embedding said powder particles as a monolayer in a stratum at the surface of said light-sensitive layer to yield an image having portions varying in density in proportion to the exposure of each portion;
    (5) removing non-embedded particles from said layer to develop an image comprising said powder particles;

(6) bringing a layer comprising a composition capable of undergoing a predetermined chemical reaction into contact with said layer bearing powder particles in image-wise configuration; and (7) carrying out said predetermined chemical reaction in a predetermined configuration conforming to the image-wise configuration of said powder particles.

2. The process of claim 1, wherein said predetermined chemical reaction is a polymerization reaction, said powder particles comprise a polymerization inhibitor and said predetermined chemical reaction produces polymerized areas corresponding to a negative of the image-wise configuration of said powder particles.

3. The process of claim 1, wherein said predetermined chemical reaction is a hardening or cross-linking reaction, said powder particles comprise a complementary reagent capable of initiating said hardening or cross-linking reaction and said predetermined chemical reaction produces hardened or cross-linked areas corresponding to a positive of the image-wise configuration of said powder particles.

4. The process of claim 1, wherein said predetermined chemical reaction is a degradation reaction, said powder particles comprise a complementary reagent capable of initiating said degradation reaction and said predetermined chemical reaction leaves undegraded areas corresponding to a negative of the image-wise configuration of said powder particles.

5. The process of claim 1, wherein said predetermined chemical reaction is an addition polymerization reaction.

6. The process of claim 5, wherein said powder particles comprise a component of a free-radical polymerization catalyst and said predetermined chemical reaction produces polymerized areas corresponding to a positive of the image-wise configuration of said powder particles.

7. The process of claim 6, wherein said component of a free-radical polymerization catalyst is an accelerator.

8. The process of claim 5, wherein said powder particles comprise a free-radical polymerization inhibitor and said predetermined chemical reaction produces polymerized areas corresponding to a negative of the image-wise configuration of said powder particles.

9. The process of claim 5, wherein said powder particles comprise a carrier.

10. The process of claim 4, wherein said powder particles comprise an enzyme.

11. The process of claim 1, wherein said light-sensitive organic material comprises a member selected from a group consisting of internally ethylenically unsaturated acids, internally ethylenically unsaturated esters, halogenated hydrocarbons and mixtures thereof.

12. The process of claim 11, wherein said organic material comprises a partially hydrogenated rosin acid.

13. The process of claim 11, wherein said organic material comprises a partially hydrogenated rosin ester.

14. The process of claim 11 wherein said organic material comprises a phosphatide.

15. The process of claim 11, wherein said organic material comprises a halogenated hydrocarbon.

16. The process of claim 1, wherein said light-sensitive organic material comprises a polymer of an ethylenically unsaturated monomer.

17. The process for carrying out a predetermined chemical reaction in image-wise configuration which comprises bringing into contact (1) a first layer comprising a composition capable of undergoing a free-radical polymerization with a second layer bearing powder particles in image-wise configuration, said particles comprising at least one component selected from the group consisting of a free-radical polymerization catalyst, a free-radical polymerization accelerator and a free-radical polymerization inhibitor and (2) carrying out said free-radical polymerization reaction in a predetermined configuration conforming to the image-wise configuration of the powder particles of said second layer.

18. The process of claim 17, wherein said power particles comprise a polymerization inhibitor and said predetermined chemical reaction produces polymerized areas corresponding to a negative of the image-wise configuration of said powder particles.

19. The process of claim 17, wherein said powder particles comprise a component of a free-radical polymerization catalyst and said predetermined chemical reaction produces polymerized areas corresponding to a positive of the image-wise configuration of said power particles.

20. The process of claim 19, wherein said component of a free-radical polymerization catalyst is an accelerator.

21. The process of claim 17, wherein said powder particles comprise a free-radical polymerization inhibitor and said predetermined chemical reaction produces polymerized areas corresponding to a negative of the image-wise configuration of said powder particles.

22. The process of claim 17, wherein said powder particles comprise a carrier.

References Cited

UNITED STATES PATENTS

| 3,236,640 | 2/1966 | Tomanek et al. | 96—115 |
| 3,499,781 | 3/1970 | Trueckel | 96—115 |
| 3,060,026 | 10/1962 | Heiart | 96—28 |
| 3,236,647 | 2/1966 | Philpot | 96—34 |
| 2,090,450 | 8/1937 | Kogel | 96—48 |
| 2,297,691 | 10/1942 | Carlson | 96—1 |
| 3,436,215 | 4/1969 | Levinos et al. | 96—35.1 |

NORMAN G. TORCHIN, Primary Examiner

E. C. KIMLIN, Assistant Examiner

U.S. Cl. X.R.

96—35.1, 28, 34, 48

UNITED STATES PATENT OFFICE
CERTIFICATE OF CORRECTION

Patent No. 3,676,146                    Dated  July 11, 1972

Inventor(s)   Thomas F. Protzman

It is certified that error appears in the above-identified patent and that said Letters Patent are hereby corrected as shown below:

Column 1, lines 39-40, for "followered" read ---followed---
Column 2, line 29, for "light-ensitive" read ---light-sensitive---
Column 7, line 48, for "1969, now U. S." read ---1969, in the name of Hayes, now U. S.---
Column 8, line 48, for "B" read ---8---
Column 8, line 51, for "Auramine A" read ---Auramine O---
Column 9, line 2, for "broden" read ---broaden---
Column 9, line 18, for "acylcins" read ---acyloins---
Column 11, line 24, for "pwoder" read ---powder---
Column 11, line 71, for "napthylamine" read ---naphthylamine---
Column 12, line 13, for "unsautrated" read ---unsaturated---
Column 12, line 17, for "unsautrated" read ---unsaturated---
Column 14, line 43, for "reqired" read ---required---
Column 16, line 9, for "polymers as" read ---polymers such as---
Column 16, line 46, for "diethyl" read ---diethylene---
Column 20, line 6, for "Chloroethene" read ---Chlorothene---
Column 20, line 9, for "Chloroethene" read ---Chlorothene---
Column 20, line 33, for "Chloroethene" read ---Chlorothene---
Column 21, lines 18-19, for ". after" read ---.  After---
Column 22, line 18, for "moisturize" read ---moisturizing---
Column 26, lines 9-10, for "polymerization with" read ---polymerization reaction with---
Column 26, line 19, for "power particles" read ---powder particles---
Column 26, line 28, for "power particles" read ---powder particles---

Signed and sealed this 1st day of January 1974.

(SEAL)
Attest:

EDWARD M. FLETCHER, JR.          RENE D. TEGTMEYER
Attesting Officer                Acting Commissioner of Patents